United States Patent [19]
Hanz et al.

[11] Patent Number: 4,629,893
[45] Date of Patent: Dec. 16, 1986

[54] DEVICE FOR DETACHABLY SECURING A COLLIMATOR TO A RADIATION DETECTOR

[75] Inventors: George J. Hanz, Bloomingdale, Ill.; Guenter Jung, Roettenbach; Michael Pflaum, Aisch, both of Fed. Rep. of Germany

[73] Assignee: Siemens Gammasonics, Inc., Des Plaines, Ill.

[21] Appl. No.: 717,762

[22] Filed: Mar. 29, 1985

[51] Int. Cl.$^4$ ................................................. G01T 1/20
[52] U.S. Cl. ............................. 250/363 S; 250/505.1; 403/344; 378/147
[58] Field of Search ............ 250/363 S, 363 SF, 505.1; 403/344, 24; 269/77, 78; 378/147

[56] References Cited
U.S. PATENT DOCUMENTS

| | | | |
|---|---|---|---|
| 764,399 | 7/1904 | Villiger, Jr. | 403/344 |
| 945,106 | 1/1910 | Moodey | 403/344 |
| 1,320,600 | 11/1919 | Bush | 403/344 |
| 3,349,808 | 4/1966 | Gustafson et al. | 403/344 |
| 3,683,180 | 8/1972 | Martone et al. | 250/363 S |

FOREIGN PATENT DOCUMENTS

| | | | |
|---|---|---|---|
| 2655111 | 6/1978 | Fed. Rep. of Germany | 403/344 |
| 1103563 | 1/1968 | United Kingdom | 250/505.1 |
| 1205231 | 9/1970 | United Kingdom | 250/505.1 |
| 1435468 | 5/1976 | United Kingdom | 403/344 |

Primary Examiner—Craig E. Church
Assistant Examiner—David Porta
Attorney, Agent, or Firm—Mark H. Jay

[57] ABSTRACT

A device for detachably securing a collimator to a radiation detector, comprising a first and second annular grooves secured to the radiation detector and the collimator respectively, a split ring having a first and second ring ends and being received in the first annular groove, and a ring diameter control system. The latter one includes a rotating hub and a first and second lever systems connected between the first and second ring ends and the rotating hub. By rotating the hub the ring ends are spread by the lever systems between a first position, where the split ring is alone positioned in the first annular groove, and a second position, where the split ring is arranged in both the first and second annular grooves, thereby attaching the collimator to the radiation detector.

19 Claims, 7 Drawing Figures

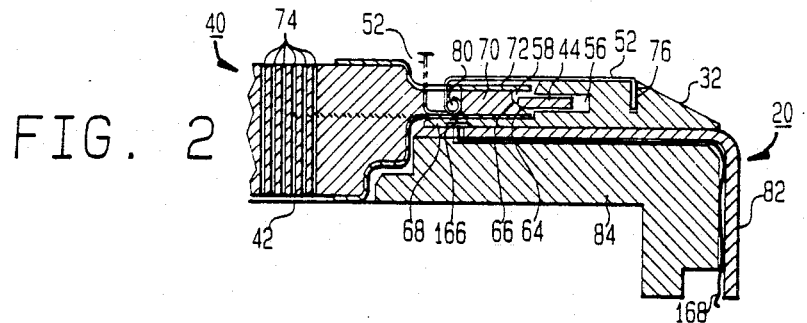
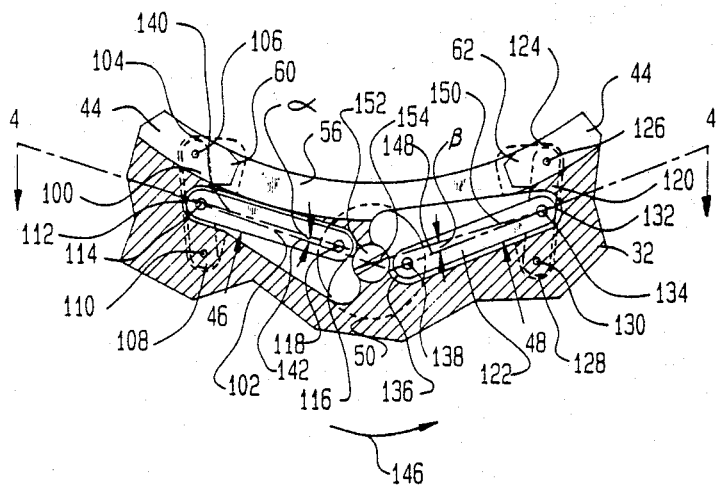
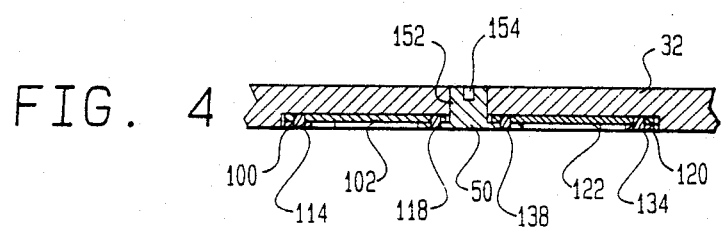
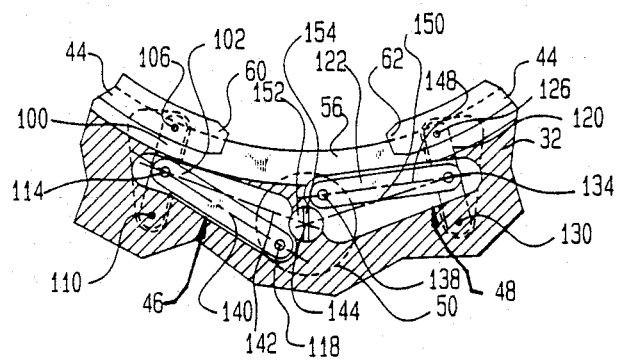

DEVICE FOR DETACHABLY SECURING A COLLIMATOR TO A RADIATION DETECTOR

BACKGROUND OF THE INVENTION

1. Field of the Invention

The present invention relates to a device for detachably securing a collimator to a radiation detector, such as for example a gamma camera head or an x-ray detector.

2. Description of the Prior Art

A device for detachably securing a collimator to a gamma camera head is, for example, described in the commonly-owned patent application Ser. No. 588,845 entitled "A Device for Attaching a Collimator to a Radiation Detector" filed on Mar. 12, 1984 by Anatoly I. Gosis, Margaret Fialko and George J. Hanz. A number of cleats are mounted at the radiation detector for cleating the collimator to the radiation detector and a latch serves for latching the cleated collimator against rotation. Also a collimator cleating detection means (audio and visual alarm) is associated with the cleats for detecting incorrect cleating and a collimator latch detection means (audio and visual alarm) is associated with the latch for detecting incorrect latching of the collimator.

Another device for detachably securing a collimator to a gamma camera head, which utilizes a bayonet coupling, is for example, described in the European patent application No. 0,066,329.

The German Pat. No. 387,688 depicts a device for detachably securing a cover on a housing. An flexible ring, which has a button is deposited in a first groove of the housing. By pressing the button with a finger the spring is deformed so that it snaps into a second groove of the cover, thereby attaching the cover on the housing.

The German Auslegeschrift No. 1,251,091 illustrates a similar device for connecting two portions of a housing by means of an elastic ring. The ring is deformed by means of two screws pressing on the ring.

The German Offenlegungsschrift No. 1,500,845 finally describes a device for detachably securing two pipes to eachother. A split ring is inserted in an inner annular groove of a pipe sleeve. The split ring comprises two ends which are bent by 90° with respect to the ring. Both ring ends are connected with a barrel cam for changing the distance between the both ring ends, thereby increasing or decreasing the ring's diameter. The barrel cam comprises a barrel and two grooves formed in the barrel wall as indicated in FIG. 4 of the German Offenlegungsschrift. Each ring end is inserted in one groove, respectively, so that when rotating the barrel from position (a) to position (c) the ring is compressed from a large to a smaller diameter. Due to that, the ring is pressed into an outward annular groove of a pipe collar. The collar thereby presses the pipes which have to be connected together.

SUMMARY OF THE INVENTION

Objects

It is an object of this invention to provide for a device for detachably securing a collimator to a radiation detector, said device being a modified split ring and variable ring diameter version so that also a very heavy collimator can easily and safely be detachably secured to a radiation detector.

It is another object of this invention to provide for a split ring collimator securing device, wherein the ring diameter control means has a simple form and a flat profile, so that it fits well on the surface of the radiation detector.

Summary

According to this invention, an improved device for detachably securing a collimator to a radiation detector is provided which comprises
(a) a first annular groove means secured to the radiation detector;
(b) a second annular groove means secured to the collimator;
(c) a split ring having a first and second ring ends, said ring being received in the first annular groove means; and
(d) a ring diameter control system, including
(d1) a first lever system having two ends;
(d2) a second lever system having two ends; and
(d3) a rotating hub rotatably secured to the detector head;

wherein the first lever system is rotatably mounted with one end linked to the first ring end and with the other end linked to the rotating hub, and wherein the second lever system is rotatably mounted with one end linked to the second ring end and with the other end linked to the rotating hub, whereby rotation of the rotating hub moves the first and second lever systems in opposite directions thereby moving the first and second ring ends between a first position, in which the split ring is positioned only in the first annular groove means, and a second position, in which the split ring is arranged in both the first annular groove means and the second annular groove means, thereby attaching the collimator to the radiation detector.

According to this invention the control means comprises a first and second lever systems and a rotating hub for controlling the position of the first and second lever systems. Such a lever control means is different from a barrel cam system as depicted in the German Offenlegungsschrift. A relatively small entrance force when rotating the hub is converted into a large clamping force by means of the lever systems and a collapsing split ring, so that also a very heavy collimator can safely be attached to the radiation detector. Furthermore a hub and lever control system according to this invention can be designed very flat so that it fits well into the surface of the radiation detector. Also, the collimator can easily be attached without any rotation of its heavy mass. This is very helpful and advantageous for the medical personnel who works with the radiation detector.

In a preferred embodiment of this invention, the first annular ring groove means together with the ring diameter control system are inserted in a ring member which is mounted at the radiation detector.

In another preferred embodiment of this invention each lever system includes a first and a second levers having each a first and second ends, wherein the first lever of the first lever system is rotatably connected with its first end to the first ring end and with its second end to radiation detector and wherein the second lever of the first lever system is rotatably connected with its first end to the first lever of the first lever system between the first lever's first and second ends and with its second end to the rotating hub, and wherein the first lever of the second lever system is rotatably connected with its first end to the second ring end and with its second end to the radiation detector and wherein the second lever of the second lever system is rotatably connected with its first end to the first lever of the second lever system between the first lever's first and second ends and with its second end to the rotating hub. Furthermore, the rotational hub preferably comprises a rotational hub axis and each first end of each second lever rotatably mounted to a corresponding first lever includes a rotational first lever end axis and the second lever in each lever system is rotatably mounted to the hub such that it is declined with respect to a connection line drawn between the rotational hub axis and the rotational first lever end axis, when the hub is in its first position, by an angle contrary to the rotation of the hub from the first to the second hub position.

Due to this construction, the levers of the first and second lever systems and the hub are always in an overcenter toggle position when the split ring is in its first position. In this overcenter toggle position they maintain the split ring open in opposition to the collapsing force of the ring without continual force applied to the hub. The collimator can now very easily be inserted. By slightly rotating the hub in the opposite direction the overcenter toggle effect is released. The split ring very quickly collapses into the second position. The collimator is now very safely secured to the detector head. For detaching of the collimator the hub has again to be rotated in the opposite direction against the force of the collapsed ring. The force necessary for rotating the hub is now relatively large. Due to that the ring is especially well secured against accidental opening. The collimator is absolutely secured against inadvertently dropping from the radiation detector.

The first and second groove means are preferably each a single annular groove. They can also include a certain number of small grooves which are arranged in a circle. However, a single annular ring is safer since a continuous circumferential clamping and supporting force is applied to the collimator. In case of a number of small grooves the clamping and supporting force is concentrated to several fixed points which is less safe.

The foregoing and other objects, features and advantages of the invention will be apparent from the following more particular description of a preferred embodiment of the invention, as illustrated in the accompanying drawings.

BRIEF DESCRIPTION OF THE DRAWINGS

In the drawings:

FIG. 2 is an enlarged cross section 2—2 of the radiation detector according to FIG. 1;

FIG. 3 illustrates the device for attaching a collimator as shown in FIG. 1 in an enlargement in a non-clamping position;

FIG. 4 is a longitudinal cross section 4—4 of the device in FIG. 3;

FIG. 5 is the device for attaching a collimator as shown in FIG. 1 in an enlargement in a clamping position;

DETAILED DESCRIPTION OF THE PREFERRED EMBODIMENTS

Figure 1:
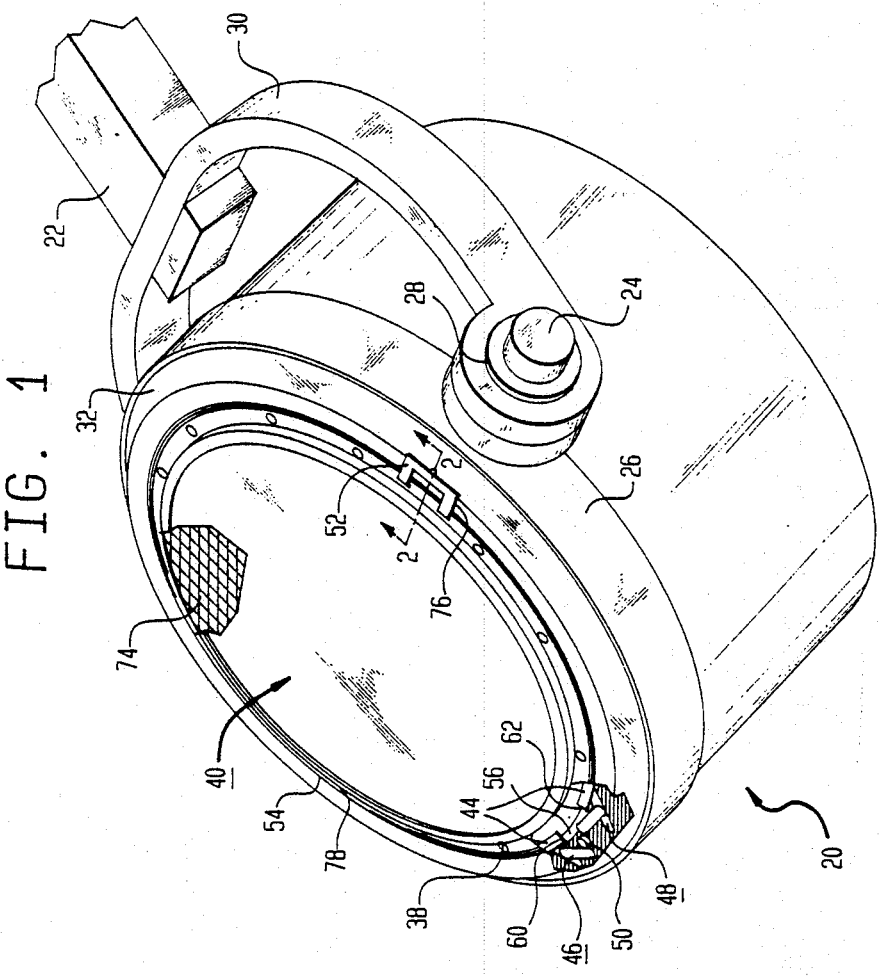
FIG. 1 shows a radiation detector comprising a device for attaching a collimator according to this invention.

FIG. 1 illustrates the head 20 of an Anger-type scintillation gamma camera as radiation detector. Such a camera is for example described in more detail in the U.S. Pat. No. 4,417,143. The camera head 20 is pivotably mounted on an end of a support arm 22 by means of trunnions 24 of a trunnion ring 26. The trunnions 24 are received in eyes 28 of a yoke portion 30 of the support arm 22.

The camera head 20 further comprises a ring member 32 mounted on the annular front surface 34 of the camera head housing 36 by means of screws 38.

A collimator 40 (in this case e.g. low energy collimator) is detachably secured to the camera head 20, so that it covers the active surface 42 (FIG. 2) of the scintillation crystal assembly (not shown in detail) of the camera head 20, by means of a split ring 44, the diameter of which is controllable by means of a first and second lever systems 46, 48 and a rotating hub 50. The collimator comprises two handholds 52, 54 for manual operation.

As shown in FIG. 2, the ring member 32 comprises a first single annular groove 56 and the collimator at its circumference comprises a second single annular groove 58. The split ring 44, which has a first ring end 60 and a second ring end 62, is deposited in the first annular groove 56 of the ring member 32 mounted on the camera head 20. In the non-clamping position the split ring 44 is alone positioned in the first annular groove 56 of the ring member 32. However in the clamping position the split ring 44, which has now a smaller diameter, is positioned in both the first annular groove 56 of the ring member 32 and the second annular groove 58 of the collimator 40, thereby attaching the collimator 40 safely to the camera head 20. FIG. 2 illustrates the clamping position of the split ring 44.

As further indicated in FIG. 2 the split ring 44 contains a tapered surface 64 and the second annular groove 58 of the collimator 40 also comprises a tapered surface 66. Both surfaces 64 and 66 are complimentarily tapered with respect to each other so that the clamping pressure between split ring 44 and collimator 40 pressing the collimator on the annular footplate 68 of the ring member 32 is additionally enhanced.

The collimator of FIG. 2 is of conventional design with the only modification that for providing for a tapered surface on second annular groove 58 a tapered surface metal piece 70 shaped as indicated in FIG. 2 has been inserted (e.g. fixed by screws) in the conventional collimator's circumferential clamping groove 72. The passage holes of collimator 40 for the gamma rays are generally designated with 74.

As is also depicted in FIGS. 1 and 2 the ring member 32 further comprises grooves 76 and 78 for each handhold 52 and 54 of collimator 40 in the collimator clamping position. Therefore, both handholds 52 and 54 smoothly fit into the overall flat surface area between collimator 40 and ring member 32, that ring member 32 being flat enough not to exceed the collimator front surface. For demounting of collimator 40, both handholds 52 and 54 can be brought in an upright position, as indicated by broken lines in FIG. 2, by turning the handhold around swivel axis 80.

The element 82 in FIG. 2 indicates a portion of the steel housing of the camera head 20. The element 84 is a portion of a lead shielding. The split ring 44 is preferably made of steel and has a flat rectangular cross section.

FIGS. 3 to 5 depict in more detail the device for attaching collimator 40 according to this invention. FIG. 3 shows the nonclamping position and FIG. 5 illustrates the clamping position. FIG. 4 is a cross section of FIG. 3.

As indicated in FIGS. 3 to 5 the first lever system 46 includes a first lever 100 and a second lever 102. The first lever 100 is rotatably connected with its first end 104 by means of a first trunnion 106 to the first ring end 60 of the split ring 44 and with its second end 108 by means of a second trunnion 110 to the ring member 32 mounted on the camera head 20. The second lever 102 is rotatably connected with its first end 112 by means of third trunnion 114 to the first lever 100 in the middle between the first lever's first and second ends 104, 108 and it is rotatably connected with its second end 116 by means of fourth trunnion 118 with the rotating hub 50.

Correspondingly the second lever system 48 contains a first lever 120 and a second lever 122. The first lever 120 is rotatably conected with its first end 124 by means of fifth trunnion 126 to the second ring end 62 of the split ring 44 and with its second end 128 by means of sixth trunnion 130 to the ring member 32. The second lever 122 is rotatably connected with its first end 132 by means of seventh trunnion 134 to the first lever 120 in the middle between the first lever's first and second ends 124, 128 and with its second end 136 by means of eighth trunnion 138 to the rotating hub 50. The trunnion 138 thereby lies nearly diametrically opposite to trunnion 118 of the second end 116 of the second lever 102 of the first lever system 46.

Under these circumstances and as illustrated in the clamping position of FIG. 3, a connection line 140 drawn between the trunnions 114 and 118 of second lever 102 of the first lever system 46 is inclined with respect to a connection line 142 drawn between trunnion 114 of second lever 102 and the rotational axis 144 of the rotating hub 50 by an angle α contrary to the rotation 146 of the hub 50 from the nonclamping to the clamping position. The same happens with respect to the second lever 122 of the second lever system 48 concerning the angle β between connection line 148 drawn between trunnions 134 and 138 and the connection line 150 drawn between trunnion 134 and rotational axis 144 of the rotating hub 50. Due to this construction, the levers of the first and second lever systems 46, 48 and the hub 50 are always in an overcenter toggle position when the split ring is in its first position. In this overcenter toggle position they maintain the split ring 44 open in opposition to the collapsing force of the ring without continual force applied to the hub. The collimator can now very easily be inserted. By slightly rotating the hub 50 in the opposite direction the overcenter toggle effect is released. The split ring very quickly collapses into the second position. The collimator is now very safely secured to the detector head. For detaching of the collimator the hub has again to be rotated in the opposite direction against the force of the collapsed ring. The force necessary for rotating the hub is now relatively large. Due to that the ring 44 is especially well secured against accidental opening. The collimator is absolutely secured against inadvertenly dropping from the radiation detector.

As is also illustrated in FIGS. 3 to 5, the rotational hub 50 is shaped as a disc and it comprises a central knob 152 having a slot 154 for inserting a rotational tool, such as a socket wrench or screwdriver, for rotating the hub 50.

As has already been mentioned, FIG. 3 illustrates hub 50 and first and second lever systems 46, 48 in the overcenter toggle position. In this overtoggle position the levers of lever systems 46, 48 and hub 50 maintain the split ring 44 open in opposition to the collapsing force of the ring without continual tortional force applied to the hub 50. The split ring 44 is deposited only in the first annular groove 56 of the ring member 32 and a collimator 40 can now easily be inserted.

In FIG. 5, hub 50 and first and second lever systems 46, 48 are in a rotational position, where the split ring 44 clamps, i.e. the split ring 44 is deposited in both the first annular groove 56 of the ring member 32 and the second annular groove 58 of the collimator 40. Collimator 40 is now safely attached to the camera head 20.

Figure 6:
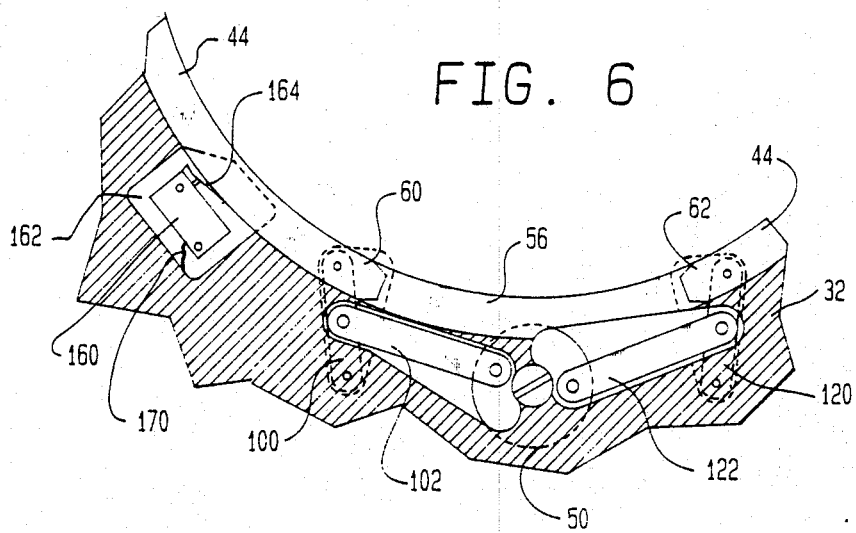
FIG. 6 is the device as shown in FIG. 3 further comprising a clamping indicator switch.

FIG. 6 illustrates a collimator clamping indicator switch 160 which is mounted in a recess 162 of the ring member 32 to detect the clamping or nonclamping status of split ring 44 by means of switch contact 164. This indicator switch 160 preferably works together with a collimator attachment switch 166 (FIG. 2) in the sense that an alarm signal is generated (by an audio and/or visual alarm generator) in case the attachment switch senses an attached collimator while the clamping indicator switch detects none or faulty clamping. This measure enhances further the safety of the collimator attaching device. The signal lines of both switches are generally designated with 168, 170, respectively.

Figure 7:
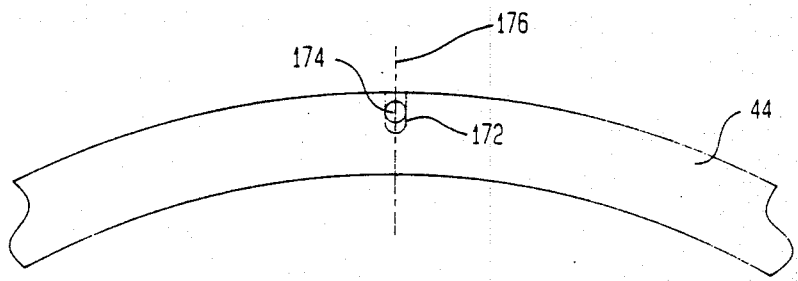
FIG. 7 is a split ring guidance between radiation detector and split ring of the collimator attaching device.

FIG. 7 finally shows a portion of the split ring 44 having a radial slot 172 which is slidable along a pin 174. Pin 174 and slot 172 are located on the ring member 32 and the split ring 44, respectively, in a position diametrically opposite to the ring ends 60, 62 and the hub and lever system 46, 48, 50. When the diameter of the split ring 44 changes by moving it between the nonclamping and the clamping position the ring with slot 172 slides along line 176. A ring displacement by rotation is impossible.

Having thus described the invention with particular reference to the preferred forms thereof, it will be obvious to those skilled in the art to which the invention pertains, after understanding the invention, that various changes and modifications may be made therein without departing from the spirit and scope of the invention as defined by the claims apended hereto.

What is claimed is:

1. A device for detachably securing a collimator to a radiation detector, comprising:
   (a) a first annular groove means secured to the radiation detector;
   (b) a second annular groove means secured to the collimator;
   (c) a split ring having a first and second ring ends, said ring being received in the first annular groove means; and
   (d) a ring diameter control system, including
      (d1) a first lever system having two ends;
      (d2) a second lever system having two ends; and
      (d3) a rotating hub being rotatably secured to the detector head;
   wherein the first lever system is rotatably mounted with one end linked to the first ring end and with the other end linked to the rotating hub, and wherein the second lever system is rotatably mounted with one end linked to the second ring end and with the other end linked to the rotating hub, such that rotation of the rotating hub moves the first and second lever systems in opposite directions thereby moving the first and second ring ends between a first position, in which the split ring is positioned only in the first annular groove means, and a second position, in which the split ring is located in both the first annular groove means and the second annular groove means, thus attaching the collimator to the radiation detector.

2. The device according to claim 1, wherein the first annular groove means comprises one single annular groove for the split ring.

3. The device according to claim 1, wherein the second annular groove means comprises one single annular groove for the split ring.

4. The device according to claim 1, wherein the first and second lever systems are rotatably mounted at the rotating hub at diametrically opposite points.

5. The device according to claim 1, wherein each lever system includes a first and a second levers having each a first and second ends, wherein the first lever of the first lever system is rotatably connected with its first end to the first ring end and with its second end to radiation detector and wherein the second lever of the first lever system is rotatably connected with its first end to the first lever of the first lever system between the first lever's first and second ends and with its second end to the rotating hub, and wherein the first lever of the second lever system is rotatably connected with its first end to the second ring end and with its second end to the radiation detector and wherein the second lever of the second lever system is rotatably connected with its first end to the first lever of the second lever system between the first lever's first and second ends and with its second end to the rotating hub.

6. The device according to claim 5, wherein the second end of the second lever in the first lever system and the second end of the second lever in the second lever system are rotatably mounted to the rotating hub at approximately diametrically opposite points.

7. The device according to claim 6, wherein each second lever is rotatably connected with its first end at the corresponding first lever in the middle between the first lever's first and second ends.

8. The device according to claim 5, wherein the rotational hub comprises a rotational hub axis and each first end of each second lever rotatably mounted to a corresonding first lever includes a rotational first lever end axis and wherein the second lever in each lever system is rotatably mounted to the hub such that it is declined with respect to a connection line drawn between the rotational hub axis and the rotational first lever end axis, when the hub is in its first position, by an angle contrary to the rotation of the hub from the first to the second hub position.

9. The device according to claim 8, wherein each second end of each second lever comprises a rotational second lever end axis and wherein the connection line drawn between the rotational first and second lever end axes of each second lever is declined with respect to the connection line drawn between the rotational hub axis and the rotational first lever end axis.

10. The device according to claim 1, wherein the rotational hub is shaped as a disc.

11. The device according to claim 1, wherein the rotational hub comprises a central slot for inserting a rotational tool.

12. The device according to claim 11, wherein the rotational hub comprises a central knob including the slot.

13. The device according to cliam 1, wherein the split ring is flat in its cross section.

14. The device according to claim 1, wherein the first annular groove means together with the ring diameter control system are inserted in a ring member which is mounted at the radiation detector.

15. The device according to claim 1, wherein the first groove means and the portion of the split ring inserted in the first groove means each comprises a surface said surfaces being complimentarily tapered with respect to each other.

16. The device according to claim 1, further comprising a collimator clamping indicator means connected with the split ring for indicating collimator nonclamping or clamping status of the split ring.

17. The device according to claim 1, further comprising a collimator attachment indicator for indicating that a collimator has been attached to the radiation detector.

18. The device according to claim 1, further comprising a split ring rotation preventing means located at the radiation detector in a position diametrically opposite to the ring ends for preventing the split ring from rotation while changing the ring diameter between the first and the second ring ends positions.

19. The device according to claim 18, wherein the split ring rotation preventing means comprises a pin at the radiation detector and a radial guidance slot in the split ring fitting to the pin.

* * * * *